Dec. 23, 1958 K. NURMSE 2,865,662
MEANS FOR REMOVABLY MOUNTING A MEMBER ON A SHAFT
Filed Sept. 6, 1955
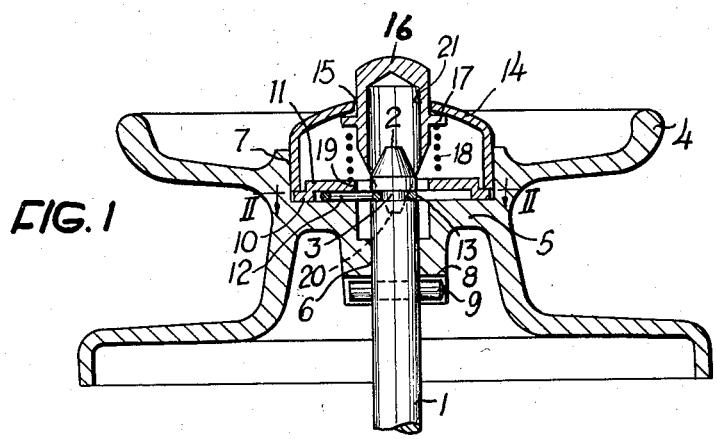
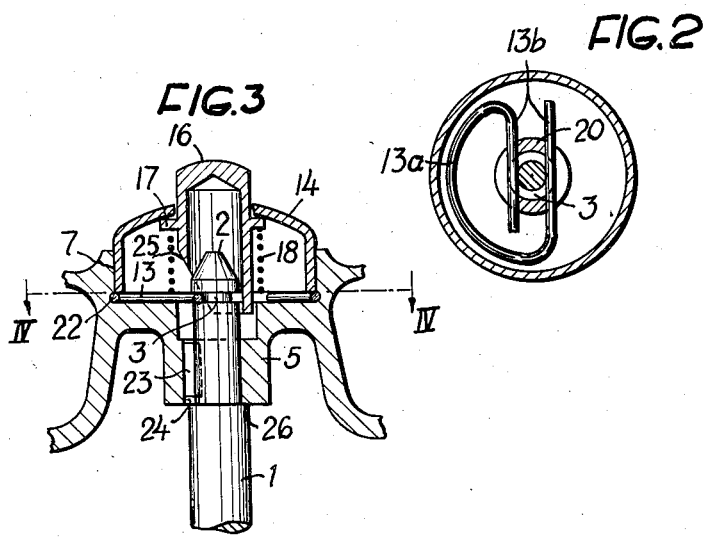
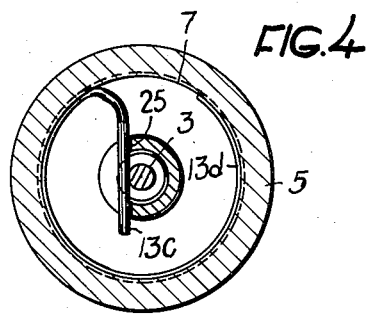

United States Patent Office 2,865,662
Patented Dec. 23, 1958

2,865,662

MEANS FOR REMOVABLY MOUNTING A MEMBER ON A SHAFT

Karl Nurmse, Svangsta, Sweden, assignor to Aktiebolaget Urfabriken, Svangsta, Sweden, a corporation of Sweden Application September 6, 1955, Serial No. 532,548

Claims priority, application Sweden September 10, 1954

2 Claims. (Cl. 287—53)

This invention relates to means for removably mounting member on a shaft by pushing said member over the end of said shaft. The invention is specially well adapted for the line spools of fishing reels, in whcih the line spool is easily removably mounted on the shaft.

Especially in fishing reels and like devices it is of great importance, that all the outer parts of the rotatable spool are entirely co-axial with the spool so as to prevent entanglement of the line due to eccentric projecting parts.

The present invention is concerned with simple means permitting the fixing of the spool or any other rotatable member on its shaft by simply pushing said member over the end of the shaft and the releasing of said member from the shaft by pressing in a button coaxially with the shaft.

For this purpose there is provided within the member to be fixed on the shaft a locking spring having a leg portion movable transversely of the shaft and adapted to engage a peripheric groove in the end portion of the shaft and to project beyond the shaft, and a pressure member displaceable longitudinally of the shaft and presenting a bevelled surface adapted to engage the leg portion of the spring for removing it from the groove in the shaft when the pressure member is pushed in axially.

Further features and details of the invention will be seen from the following description of two different embodiments of the invention illustrated in the accompanying drawings.

Fig. 1 is a longitudinal section through the spool of a fishing reel provided with the means according to the present invention. Fig. 2 is a cross section along line II—II in Fig. 1. Fig. 3 is an axial section in part through a second embodiment of the invention and Fig. 4 is a cross section along line IV—IV in Fig. 3.

Referring to Figs. 1 and 2, 1 is the shaft of the spool of a fishing reel of known design of which only the parts of interest in this connection are illustrated, i. e. the spool itself and the means for fixing said spool on the shaft. The shaft 1 has a conical end 2 and a peripheric groove 3 just below said conical end. The spool 4 has a hub portion 5 having a bore 6 adapted to slidably fit on shaft 1 and in its outer portion a cylindrical recess 7. The inner end of the hub portion 5 of the spool 4 has a diametral groove 8 adapted to be engaged by a transverse pin 9 fixed through the shaft 1, when the spool is pushed in position on the shaft as illustrated in Fig. 1, so as to prevent the spool from rotation relative to the shaft.

The bottom of the recess 7 is plane and the downwardly deformed border portion 10 of a disc 11 rests against the border portion of said bottom. The space thus formed between the disc 11 and the bottom surface of the recess 7 forms a chamber 12 corresponding with the peripheral groove 3 when the spool is pushed in place on the shaft. This chamber contains a wire spring 13 bent to a form shown in Fig. 2. The spring has an arched portion 13a running essentially concentrically with the shaft 1 and two parallel straight end portions or legs 13b each connected to the arched portion by a bend.

The two legs 13b are arranged to run approximately at equal distances from the axis of the spool.

Outside the disc 11 a cup shaped hood 14 is by its cylindrical border walls fixed against the cylindrical wall of the recess 7 and forms with its upturned, dome shaped bottom a concentric, smooth and rounded projection on the outside of the spool. The dome shaped bottom of the hood 14 has a central hole 15 through which extends a press button 16, retained by a flange 17 resting against the inside of the hood under the action of a spring 18 placed under compression between said flange and the disc 11. A central hole 19 in said disc has a diameter slightly exceeding the outer diameter of a downward hollow cylindrical extension of the press button, which has a central bore 21 of slightly larger diameter than the shaft 1. The downward extension of the press button is bevelled on opposite sides to form wedge like portions 20 engaging between the legs 13b of the spring 13 on both sides of the shaft, as illustrated in Fig. 2. The wedge like portions 20 of the press button 16 are so formed, that in the rest position of said button illustrated in Figs. 1 and 2, in which the button is maintained by the spring 18, said portions always extend in between the legs 13b of the spring but permit the latter to engage the groove 3, whereby the legs 13b of the spring 13 are always maintained in equidistant position relative to the axis of the spool even when the spool is not mounted on the shaft, and a rotation of the press button and the spring relatively to each other is prevented.

In the illustrated position of the spool, in which it is mounted on the shaft the spool is maintained on the shaft by engagement of the spring legs 13b in the groove 3 and rotation of the spool relative to the shaft 1 is prevented by the engagement of pin 9 in the transverse groove 8.

In order to remove the spool from the shaft the press button 16 is pressed inwards against the compression of the spring 18 and the wedge formed portions 20 are thereby pushed in between the legs 13b of the spring so as to displace them away from each other and out of the groove 3 in the shaft 1. While maintaining the press button in its pressed down position the spool can be removed without resistance. For this purpose the spool is preferably seized between the thumb and the middle finger and the press button actioned with the fore finger of the same hand.

In order to replace the spool on the shaft, it is simply pushed in over the end of the shaft, whereby the conical end 2 of the shaft engages between the legs of the spring until the inner end surface of the hub abuts the transverse pin 9. The spool is then turned round until pin 9 enters the transverse groove 8, the legs 13b of the spring being then pushed apart by the conical end 2 of the shaft until they fall into the peripheral groove 3.

Different modifications of the embodiment above described are illustrated in combination with each other in Figs. 3 and 4, though said modification need not be used simultaneously but may be combined individually with the embodiment shown in Figs. 1 and 2.

Thus instead of having two end legs of the spring engaging the peripheral groove 3 on the shaft 1, the spring might have only one leg 13c engaging said groove from one side, in which case the press button 16 has its inner end portion bevelled only on one side at 25, as illustrated in Figs. 3 and 4.

Instead of maintaining the spring in its axial position by means of the disc 11 illustrated in Fig. 1, the spring is maintained in position by engaging a groove 22 in the inner end of the cylindrical wall of recess 7 and by being maintained in engagement with said groove by its own elasticity, in which case the spring is formed with a circular portion 13d which in expanded state has a diameter larger than the diameter of the groove 22.

The abutment for the inner end of the hub portion 5 of the spool preventing the spool from being pushed farther inwards than necessary for the spring 13 to engage the peripheral groove 3 in the shaft 1 is in the embodiment illustrated in Figs. 3 and 4 formed by a circular abutment 26 on the shaft itself and the means for preventing the spool from rotating on the shaft are formed by a wedge 23 engaging an axial groove 24 in the boring 6.

In this embodiment, the spool is handled in exactly the same manner as described in connection with Figs. 1 and 2 for its fixation on the shaft and for its removal.

I claim:

1. In combination with a shaft having a tapered end, a pin secured to said shaft transversely of its axis and spaced from said tapered end, said shaft having a peripheral groove intermediate said pin and said tapered end; a fishing line spool removably and non-rotatably connected to said shaft, said spool having at one end a centrally located hub portion with a longitudinal bore therein extending through said spool, said hub portion terminating in an end surface having a diametric groove therein, the bore of said spool receiving said shaft with said shaft pin being inserted within the diametric groove in said hub portion to prevent rotation of said spool relative to said shaft, said spool having a centrally located recess at the other end thereof, a centrally-apertured disk in the bottom of said cylindrical recess having a central portion parallel to and spaced from the bottom surface of the cylindrical recess, the tapered end of said shaft extending through said disk, a locking spring within said recess intermediate the bottom surface thereof and said disk, said locking spring having two parallel leg portions extending on opposite sides of said shaft in engagement with the peripheral groove therein and an arched portion essentially concentric with the peripheral wall of said cylindrical recess, said locking spring preventing axial displacement of said spool relative to said shaft, a hood member mounted in the cylindrical recess in said spool, said hood member having a tubular flanged portion contiguous with the wall of said cylindrical recess and also having a central opening therein, and means for radially displacing the leg portions of said spring out of engagement with the peripheral groove in said shaft comprising a push button longitudinally movable within said hood opening colinearly with respect to said shaft, said push button having a wedge end portion adjacent the tapered end of said shaft and arranged to be inserted intermediate said spring leg portions, and spring means normally biasing said push button axially away from said shaft, whereby upon manual displacement of said press button axially toward said shaft said locking spring will be deformed out of engagement with said shaft to permit removal to said spool from said shaft.

2. Apparatus as defined in claim 1 wherein the peripheral end portion of said disk is maintained in contiguous engagement with the bottom surface of the cylindrical recess by means of the extremity of the tubular flanged portion of said hood member within said cylindrical recess.

References Cited in the file of this patent
UNITED STATES PATENTS

| | | |
|---|---|---|
| 213,425 | Howland | Mar. 18, 1879 |
| 1,474,153 | Klein | Nov. 13, 1923 |
| 1,820,323 | Powell | Aug. 25, 1931 |
| 2,009,371 | Junge | July 23, 1935 |